Jan. 22, 1963 G. A. MALEY 3,074,640

FULL ADDER AND SUBTRACTOR USING NOR LOGIC

Filed Dec. 19, 1960

INVENTOR.
GERALD A. MALEY

BY Edward G. Fiorito

AGENT 3,074,640

FULL ADDER AND SUBTRACTOR USING NOR LOGIC

Gerald A. Maley, Poughkeepsie, N.Y., assignor to International Business Machines Corporation, New York, N.Y., a corporation of New York Filed Dec. 19, 1960, Ser. No. 76,622
3 Claims. (Cl. 235—176)

This invention relates to circuits used in digital computers and, more particularly, to a new Full Adder and Subtractor composed of logical circuit elements. The matter disclosed but not claimed in FIG. 5, particularly NOR circuits 51–54, is claimed in copending application Serial No. 76,641, assigned to the same assignee and filed concurrently herewith.

Most of the Full Adders and Subtractors in digital computers are composed of logical circuit elements of the AND, OR, and NOT type. Several problems are encountered when using a plurality of types of logical circuit elements to construct a Full Adder and Subtractor circuit to be used in a digital computer. In order to minimize the length of the interconnections between each logical circuit element, the proper circuit elements must be grouped adjacent to each other in the computer to form the Full Adder and Subtractor. Frequently this requirement of orienting the circuit elements adjacent to each other results in an inefficient use of the space in the computer. Maintenance of such a computer requires that each type of group of circuit elements be on hand for replacement in the computer. Each circuit element must be manufactured in a different manner and therefore the computer does not lend itself to mass production techniques. In the Full Adder and Subtractor of this invention, only a single type of circuit element called the NOR circuit is used. Since each circuit element is identical there is no requirement of placing particular types of circuit elements adjacent to each other in the computer in order to form a Full Adder and Subtractor. A computer having only a single type of circuit element lends itself to mass production techniques. It is also easier to maintain since only a single type of circuit element need be stored. Further, it is easier to service since the particular type of circuit element which requires replacement need not be determined, there being only one type in the computer.

It is an object of this invention to provide an improved Full Adder and Subtractor circuit using only a single type of logical circuit element.

It is a further object of this invention to provide such a Full Adder and Subtractor circuit wherein each of the logical circuit elements has an identical number of inputs and outputs.

It is a further object of this invention to provide a Full Adder and Subtractor using a minimum number of such logical circuit elements.

The foregoing and other objects, features and advantages of the invention will be apparent from the following more particular description of preferred embodiments of the invention, as illustrated in the accompanying drawings.

Figure 1:
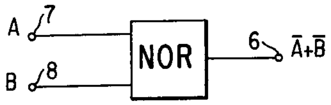
FIG. 1 is a block diagram of a NOR logical circuit element.
Figure 5:
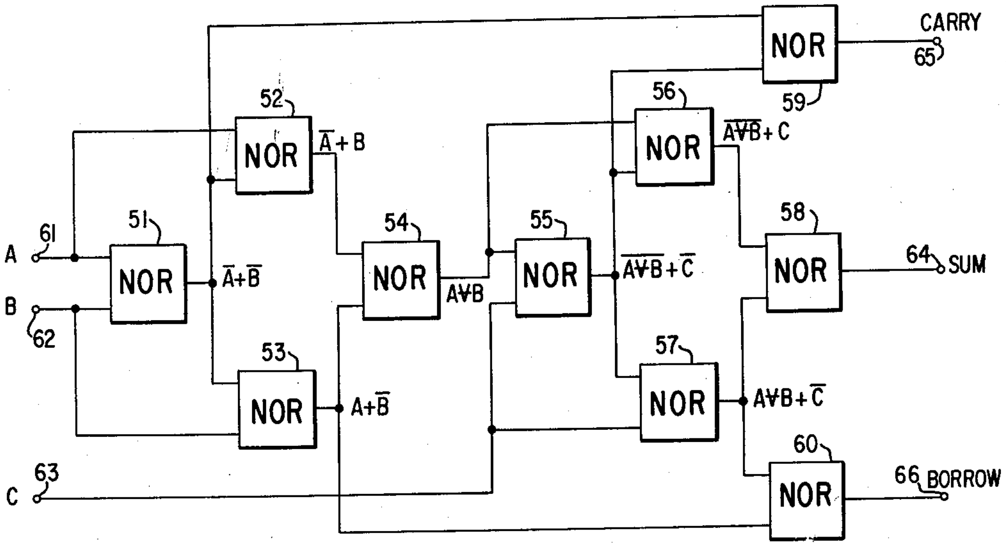
FIG. 5 is a Full Adder and Subtractor embodying this invention.

The Full Adder and Subtractor circuit shown in FIG. 5 is constructed using only a single NOR circuit element, such as that shown in FIG. 1. This circuit may be used in any digital computer where it is desired to add three binary signals representing two digits and a carry from the next lower binary digit position and to provide two binary signals representing the Sum and Carry function of the three binary signals. This circuit may also be used in digital computers when it is desired to subtract three binary signals representing two digits and a borrow from the next lower binary digit position and to provide two binary signals representing the Difference and Borrow function of the three binary signals.

The NOR circuit of FIG. 1 performs the logical operation of providing an output on terminal 6 when the binary signal A on terminal 7 is absent or the binary signal B on terminal 8 is absent. The Boolean expression at the output terminal 6 is an algebraic statement of the presence and absence of the signal at terminal 6 as a function of the presence and absence of the signals on terminals 7 and 8.

Figure 2:
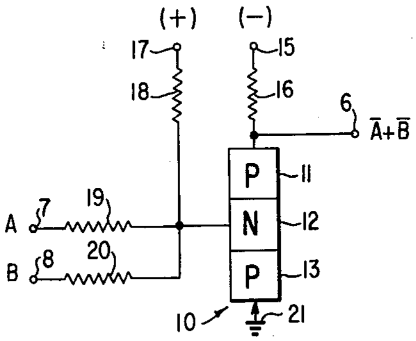
FIG. 2 is a transistor circuit capable of performing the logical operation of the NOR circuit in FIG. 1.

A preferred circuit is shown in FIG. 2 capable of performing the operation of the NOR circuit of FIG. 1. This circuit includes a PNP transistor 10 of the junction type, having a collector 11, a base 12, and an emitter 13. The collector 11 is biased by the negative voltage supply on terminal 15 through resistor 16. The base 12 is biased by the positive voltage supply on terminal 17 through resistor 18 so that the transistor 10 is not conducting when no signals are connected to terminals 7 and 8. When the transistor 10 is not conducting, the voltage level on output terminal 6 approaches the negative level of the supply on terminal 15. The resistors 19 and 20 are designed so that when a negative voltage is applied to either terminal 7 or terminal 8, the transistor 10 conducts causing the voltage level on output terminal 6 to approach the positive level of ground 21 connected to the emitter 13. When a positive voltage is applied to both terminals 7 and 8, the transistor 10 does not conduct. If the presence of the binary signals A and B is allowed to be represented by a positive voltage signal, the Boolean expression at the output terminal 6 is an algebraic statement of when the voltage level on output terminal 6 approaches the positive level of ground 21. That is, when signal A is not present, or when signal B is not present, the voltage level on terminal 7 or terminal 8 is negative, causing transistor 10 to conduct. The voltage on output terminal 6 approaches the more positivel level of the ground 21, representing the presence of an output signal. The resistors and voltage supplies in FIG. 2 can be designed so that the output signal generated on terminal 6 is sufficient to operate another NOR circuit having its input terminal 7 or 8 connected to this output terminal 6.

Figure 3:
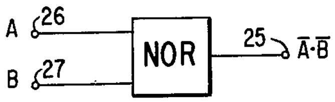
FIG. 3 is a block diagram of another NOR logical circuit element.

The logical operation of the NOR circuit in FIG. 1 is called the Stroke function. This circuit will hereinafter be called the Stroke function NOR circuit. Another NOR circuit capable of implementing the Full Adder and Subtractor of FIG. 5 is shown in FIG. 3. This circuit is called the Dagger function NOR circuit and performs a slightly different logical operation. An output is present on terminal 25 when no signal is present on terminal 26 and no signal is present on terminal 27. The Boolean expression at the output terminal 25 is an algebraic statement of this operation.

Figure 4:
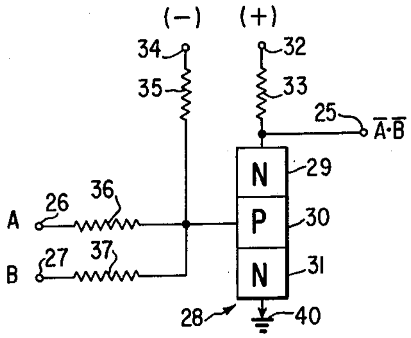
FIG. 4 is a transistor circuit capable of peforming the logical operation of the NOR circuit in FIG. 3.

In FIG. 4, a preferred transistor circuit is shown capable of performing the logic of the Dagger fucntion NOR circuit in FIG. 3. This circuit includes an NPN transistor 28 of junction type having a collector 29, a base 30, and an emitter 31. The collector 29 is biased by the positive voltage supply on terminal 32 through resistor 33. The base 30 is biased by the negative voltage supply on terminal 34 through resistor 35 so that the transistor 28 is not conducting when no signals are applied to the terminals 26 and 27. When the transistor is not conducting, the voltage on terminal 25 approaches the level of the positive supply on terminal 32. Resistors 36 and 37 are designed so that, when a positive voltage signal is applied to either terminal 26 or terminal 27, the transistor 28 conducts, causing the voltage on terminal 25 to approach the potential of ground 40 connected to emitter 31. When both signals on terminals 26 and 27 are negative, the transistor does not conduct. Where the presence of the binary signals A and B is represented by a positive voltage, the Boolean expression at the output terminal 25 is an algebraic statement of when the terminal 25 will approach a positive level of the supply on terminal 32. That is, when the binary signal A is not present and B is not present, both terminals 26 and 27 are at a negative potential and transistor 28 is not conducting. The voltage on terminal 25 approaches the positive voltage on terminal 32. The resistors and voltage supplies in FIG. 4 may be designed so that the output terminal 25 may be connected to an input terminal 26 or 27 of another Dagger function NOR circuit so that a series of these circuits can be constructed, the operation of each depending upon the signals generated by the preceding NOR circuit The Full Adder and Subtractor of FIG. 5 may be constructed using only the transistor circuit of FIG. 2. When the circuit is to be used as a Full Adder, the Borrow NOR circuit 60 is not required. The signals A and B representing the binary digits to be added are applied to the terminals 61 and 62 respectively. The binary signal C representing the Carry function from the next lower binary digit position as applied to the terminal 63. The Sum function of the three binary signals, A, B and C, is provided on the output terminal 64. The Carry function is provided on output terminal 65. The interconnections between the NOR circuits 51—59 are carefully chosen so that a minimum number of NOR circuits each having two inputs and a single output is required to generate the Sum and Carry functions. When the NOR circuit of FIG. 2 is employed, the Boolean expression at the output of each NOR circuit defines when these outputs are present. The expressions at the output of NOR circuits 52—57 may be derived using the basic principles of Boolean algebra, as taught in the text Arithmetic Operations in Digital Computers by R. K. Richards, Van Nostrand Co., Inc., as follows:

NOR circuit 52 inputs: $A$; $\overline{A}+\overline{B}$ output: $\overline{A}+\overline{\overline{A}+\overline{B}}=\overline{A}+A\cdot B=\overline{A}+B$ NOR circuit 53 inputs: $\overline{A}+\overline{B}$; $B$ output: $\overline{\overline{A}+\overline{B}}+\overline{B}=A\cdot B+\overline{B}=A+\overline{B}$ NOR circuit 54 inputs: $\overline{A}+B$; $A+\overline{B}=$ output: $\overline{\overline{A}+B}+\overline{A+\overline{B}}=\overline{A}\cdot B+A\cdot\overline{B}=A\veebar B$ NOR circuit 55 inputs: $A\veebar B$;$C$ output: $\overline{A\veebar B}+\overline{C}$

NOR circuit 56 inputs: $A\veebar B$; $\overline{A\veebar B}+C$ output: $\overline{A\veebar B}+\overline{\overline{A\veebar B}+\overline{C}}=\overline{A\veebar B}+A\veebar B\cdot C=\overline{A\veebar B}+C$ NOR circuit 57 inputs: $\overline{A\veebar B}+\overline{C}$;$C$ output: $\overline{\overline{A\veebar B}+\overline{C}}+\overline{C}=A\veebar B\cdot C+\overline{C}=A\veebar B+\overline{C}$ The Boolean expression for the Sum NOR circuit 58 and Carry NOR circuit 59 may be derived as follows:

Sum NOR circuit 58 inputs: $\overline{A\veebar B}+C$;$A\veebar B+\overline{C}$ output: $\overline{\overline{A\veebar B}+C}+\overline{A\veebar B+\overline{C}}=A\veebar B\cdot C+A\veebar B\cdot C=SUM$ Carry NOR circuit 59 inputs: $\overline{A}+\overline{B}$;$\overline{A\veebar B}+\overline{C}$ output: $\overline{\overline{A}+\overline{B}}+\overline{\overline{A\veebar B}+\overline{C}}=A\cdot B+A\veebar B\cdot C=CARRY$ When the Full Adder and Subtractor circuit in FIG. 5 is to be used only as a Full Subtractor, the Carry NOR circuit 59 is not required. The binary signals A and B representing the binary digits to be subtracted are applied to the terminals 61 and 62 respectively; B is subtracted from A. The binary signal C now representing the Borrow function from the next lower binary digit position is applied to terminal 63. The output on terminal 64 represents the Difference function for the three binary signal inputs. No change in connections is required since the Boolean expression for the Sum and Difference function is the same. Reference is made to the above text for a more detailed description of the Sum, Carry, and Borrow functions as performed by Full Adders and Subtractors. The signal on output terminal 66 from Borrow NOR circuit 60 represents the Borrow function for the three binary signals and may be derived as follows:

Borrow NOR circuit 60 inputs: $A\veebar B+\overline{C}$;$A+\overline{B}$ output: $\overline{\overline{A\veebar B}+\overline{C}}+\overline{A+\overline{B}}=\overline{A\veebar B}\cdot C+\overline{A}\cdot B=$ $(A\cdot B+\overline{A}\cdot\overline{B})\cdot C+\overline{A}\cdot B=A\cdot B\cdot C+A\cdot B\cdot C+A\cdot B=$

BORROW

It can be seen that Carry NOR circuit 59 and Borrow NOR circuit 60 can remain in the circuit without the operation of one interfering with the other. Another advantage of this Full Adder and Subtractor is that each of the NOR circuits is identical in the number of inputs and outputs used. A single type of standard circuit may be employed to generate the logical operation of the NOR circuit used in this Full Adder and Subtractor.

When the circuit of FIG. 5 is implemented with the Dagger function NOR circuit of FIG. 4, the complement of the binary signals A, B, and C must be applied to the terminals 61—63 respectively. The complements of the Carry, Sum and Borrow functions are generated on the terminals 65—66 respectively. The complement outputs are generated when the complement inputs are applied since the Dagger function NOR circuit of FIG. 4 is the dual of the Stroke function NOR circuit of FIG. 2. That is, when the complement of the signals A and B are applied to the terminals 26 and 27, the signal on output terminal 25 is the complement of the signal generated on output terminal 6, when the true form of the binary signals A and B are applied to terminals 7 and 8. This may be shown as follows:

Dagger function NOR circuit FIG. 4 inputs: $\overline{A}$;$\overline{B}$ output: $\overline{\overline{A}}\cdot\overline{\overline{B}}=A\cdot B=\overline{\overline{A}+\overline{B}}=\overline{\text{Stroke function NOR circuit output terminal 6}}$ The Stroke function NOR circuit of FIG. 2 may be shown to the dual of the Dagger function NOR circuit of FIG. 4 as follows:

Stroke function NOR circuit FIG. 2 inputs: $\overline{A}$;$\overline{B}$ output: $\overline{\overline{A}}+\overline{\overline{B}}=A+B=\overline{\overline{A}\cdot\overline{B}}=\overline{\text{Dagger function NOR circuit output terminal 25}}$ When the Full Adder and Subtractor circuit of FIG. 5 is implemented with the Dagger function NOR circuit of FIG. 4 and the complement of the binary signals are applied to terminals 61—63, the Boolean expressions at the output of each NOR circuit 51—60 may be derived as follows:

NOR circuits 51 inputs: $\overline{A};\overline{B}$ output: $\overline{\overline{A}}\cdot\overline{\overline{B}}=A\cdot B$ NOR circuit 52 inputs: $\overline{A};A\cdot B$ output: $\overline{\overline{A}}\cdot\overline{A\cdot B}=A\cdot(\overline{A}+\overline{B})=A\cdot\overline{A}+A\cdot\overline{B}=A\cdot\overline{B}$ NOR circuit 53 inputs: $A\cdot B;\overline{B}$ output: $\overline{A\cdot B}\cdot\overline{\overline{B}}=(\overline{A}+\overline{B})\cdot B=\overline{A}\cdot B+\overline{B}\cdot B=\overline{A}\cdot B$ NOR circuit 54 inputs: $A\cdot\overline{B};\overline{A}\cdot B$ output: $\overline{A\cdot\overline{B}}\cdot\overline{\overline{A}\cdot B}=\overline{A\cdot\overline{B}+\overline{A}\cdot B}=\overline{A\veebar B}$ NOR circuit 55 inputs: $\overline{A\veebar B};\overline{C}$ output: $\overline{\overline{A\veebar B}}\cdot\overline{\overline{C}}=A\veebar B\cdot C$ NOR circuit 56 inputs: $\overline{A\veebar B};A\veebar B\cdot C$ output: $\overline{\overline{A\veebar B}}\cdot\overline{A\veebar B\cdot C}=A\veebar B\cdot(\overline{A\veebar B}+\overline{C})=A\veebar B\cdot\overline{C}$ NOR circuit 57 inputs: $A\veebar B\cdot C;\overline{C}$ output: $\overline{A\veebar B\cdot C}\cdot\overline{\overline{C}}=(\overline{A\veebar B}+\overline{C})\cdot C=\overline{A\veebar B}\cdot C$ Sum NOR circuit 58 inputs: $A\veebar B\cdot\overline{C};\ \overline{A\veebar B}\cdot C$ output: $\overline{A\veebar B\cdot\overline{C}}\cdot\overline{\overline{A\veebar B}\cdot C}=\overline{A\veebar B\cdot\overline{C}+\overline{A\veebar B}\cdot C}=\overline{SUM}$ Carry NOR circuit 59 inputs: $A\cdot B;\ A\veebar B\cdot C$ output: $\overline{A\cdot B}\cdot\overline{A\veebar B\cdot C}=\overline{A\cdot B+A\veebar B\cdot C}=\overline{CARRY}$ Borrow NOR circuit 60 inputs: $\overline{A\veebar B}\cdot C;\ \overline{A}\cdot B$ output: $\overline{\overline{A\veebar B}\cdot C}\cdot\overline{\overline{A}\cdot B}=\overline{\overline{A\veebar B}\cdot C+\overline{A}\cdot B}=$ $\overline{(A\cdot B+\overline{A}\cdot\overline{B})\cdot C+\overline{A}\cdot B}=\overline{A\cdot B\cdot C+\overline{A}\cdot\overline{B}\cdot C+\overline{A}\cdot B}=$
$\overline{BORROW}$ Since the complement of the binary signals are as readily available in most digital computers as the true form of the binary signals, the Dagger function NOR circuit implementation of this Full Adder is as useful as the Stroke function NOR circuit implementation. Whichever implementation is used, the circuit as shown in FIG. 5 remains the same and only the specific circuit within each NOR circuit differs.

While the invention has been particularly shown and described with reference to preferred embodiments thereof, it will be understood by those skilled in the art that various changes in form and details may be made therein without departing from the spirit and scope of the invention.

What is claimed is:

1. A full adder circuit capable of operating upon three binary signals comprising: a first and a second group of NOR circuits, each group containing a first, a second, a third and a fourth NOR circuit, each having at least two input and an output terminal, and circuit means connecting the output of said first NOR circuit to the inputs of said second and third NOR circuits, the output of said second and third NOR circuits to the input of said fourth NOR circuit, one input of said first NOR circuit to the input of said second NOR circuit and the other input of said first NOR circuit to the input of said third NOR circuit; circuit means connecting two of said three binary signals to the inputs of the first NOR circuit in said first group, the remaining binary signal to the input of the first NOR circuit in said second group, and the output of said fourth NOR circuit in said first group to the input of said first NOR circuit in said second group; a carry NOR circuit having at least two input terminals and an output terminal; and circuit means connecting the outputs of the first NOR circuits in said first and second groups to the inputs of said carry NOR circuit, whereby the output from said fourth NOR circuit in said second group represents the sum function of said three binary signals and the output of said carry NOR circuit represents the carry function of said three binary signals.

2. Apparatus as claimed in claim 1 further characterized by the addition of a Borrow NOR circuit and circuit means connecting the output of the third NOR circuit in said first and second groups to said Borrow NOR circuit whereby the output from said Borrow NOR circuit represents the Borrow function of said three binary signals.

3. A full subtractor circuit capable of operating upon three binary signals comprising: a first and a second group of NOR circuits, each group containing a first, a second, a third and a fourth NOR circuit, each having at least two input terminals and an output terminal, and circuit means connecting the output of said first NOR circuit to the inputs of said second and third NOR circuits, the output of said second and third NOR circuits to the input of said fourth NOR circuit, one input of said first NOR circuit to the input of said second NOR circuit and the other input of said first NOR circuit to the input of said third NOR circuit; circuit means connecting two of said three binary signals to the inputs of the first NOR circuit in said first group, the remaining binary signal to the input of the first NOR circuit in said second group, and the output of said fourth NOR circuit in said first group to the input of said first NOR circuit in said second group; a borrow NOR circuit having at least two input terminals and an output terminal; and circuit means connecting the outputs of the third NOR circuits in said first and second groups to said borrow NOR circuit whereby the output from said fourth NOR circuit in said second group represents the sum function of said three binary signals and the output from said borrow NOR circuit represents the borrow function of said three binary signals.

References Cited in the file of this patent

UNITED STATES PATENTS 2,899,133 Tryon ---------------- Aug. 11, 1959

UNITED STATES PATENT OFFICE

CERTIFICATE OF CORRECTION

Patent No. 3,074,640 January 22, 1963

Gerald A. Maley

It is hereby certified that error appears in the above numbered patent requiring correction and that the said Letters Patent should read as corrected below.

Column 1, line 68, for "peforming" read -- performing --; column 4, line 33, for "$(A\cdot B+\bar{A}\cdot\bar{B})\cdot C+\bar{A}\cdot B=A\cdot B\cdot C+A\cdot B\cdot C+A\cdot B=$" read -- $(A\cdot B+\bar{A}\cdot\bar{B})\cdot C+\bar{A}\cdot B=A\cdot B\cdot C+\bar{A}\cdot\bar{B}\cdot C+\bar{A}\cdot B=$ --; column 5, line 20, for "$\overline{A\cdot\bar{B}}\cdot\overline{\bar{A}\cdot B}=A\cdot\overline{\bar{B}+\bar{A}}\cdot B=\overline{A\forall B}$" read -- $\overline{A\cdot\bar{B}\cdot\bar{A}\cdot B}=\overline{A\cdot\bar{B}+\bar{A}\cdot B}=\overline{A\forall B}$ --.

Signed and sealed this 3rd day of December 1963.

(SEAL)
Attest:

ERNEST W. SWIDER
Attesting Officer

EDWIN L. REYNOLDS
Acting Commissioner of Patents